United States Patent
Akashi

[11] Patent Number: 5,980,176
[45] Date of Patent: Nov. 9, 1999

[54] NUT STRUCTURE HAVING ANCHOR PIN BLOCKING SPLIT SLEEVE AGAINST ROTATION IN NUT BODY

[76] Inventor: Robert Akashi, 2059 W. 161st St., Torrance, Calif. 90504

[21] Appl. No.: 09/270,288

[22] Filed: Mar. 15, 1999

Related U.S. Application Data

[63] Continuation-in-part of application No. 09/063,461, Apr. 21, 1998.

[51] Int. Cl.⁶ ..................................................... F16B 39/36
[52] U.S. Cl. ............................ 411/270; 411/265; 411/433
[58] Field of Search ............................. 44/265, 266, 270, 44/278, 277, 433

[56] References Cited

U.S. PATENT DOCUMENTS

| | | |
|---|---|---|
| 791,825 | 6/1905 | Scudder et al. . |
| 1,144,645 | 6/1915 | Fehrenz . |
| 1,747,082 | 2/1930 | Reuter . |
| 1,779,896 | 10/1930 | Winter ...................................... 411/433 |
| 2,554,448 | 5/1951 | Sherwood et al. . |
| 2,569,989 | 10/1951 | Harding . |
| 5,427,488 | 6/1995 | Fullerton et al. . |

FOREIGN PATENT DOCUMENTS

| | | | |
|---|---|---|---|
| 597822 | 11/1925 | France .................................... 411/270 |
| 868307 | 12/1941 | France . |
| 0056722 | 10/1952 | France .................................... 411/265 |
| 124396 | 2/1928 | Switzerland ........................... 411/270 |
| 336910 | 10/1930 | United Kingdom ................... 411/265 |
| 553493 | 5/1943 | United Kingdom ................... 411/265 |

*Primary Examiner*—Flemming Saether
*Attorney, Agent, or Firm*—William W. Haefliger

[57] ABSTRACT

A nut device which comprises a hollow body structure having a side wall, end walls, and a tapered bore, the body structure defining a longitudinal axis; a sleeve extending in the body substantially coaxially therewith, the sleeve having a longitudinally extending split, and a side taper engaging the body structure tapered bore, the sleeve having a bore thread; an anchor pin extending longitudinally endwise in the split and anchored to at least one of the body structure end walls, for blocking rotation of the sleeve, while allowing sleeve longitudinal movement relative to the pin and body structure; at least one of the body structure end walls having a bore in alignment with the sleeve bore threading; whereby the nut device may be rotatably connected to a longitudinally extending member having threading engaging the sleeve threading, and locked to the member by squeezing the sleeve, in response to sliding engagement of the sleeve side taper with the body tapered bore.

17 Claims, 7 Drawing Sheets

NUT STRUCTURE HAVING ANCHOR PIN BLOCKING SPLIT SLEEVE AGAINST ROTATION IN NUT BODY

This application is a continuation-in-part of prior U.S. patent application Ser. No. 09/063,461, filed Apr. 21, 1998, now pending.

BACKGROUND OF THE INVENTION

This invention relates generally to locking of nut devices to work pieces; and more particularly, to improvements in assembly and operation of lock-nut type devices.

There is continual need for improvements in such devices, and particularly for improvements in their assembly, construction, and operation.

SUMMARY OF THE INVENTION

It is a major object of the invention to provide a simple, effective and rugged improved nut device meeting the above need. Basically, the improved device of the invention comprises:

a) a hollow body structure having a side wall, end walls, and a tapered bore, the body structure defining a longitudinal axis, b) a sleeve extending in the body substantially coaxially therewith, the sleeve having a longitudinally extending split, and a side taper engaging the body structure tapered bore, the sleeve having a bore thread, c) an anchor pin extending longitudinally endwise in the split and anchored to at least one of the body structure end walls, for blocking rotation of the sleeve, while allowing sleeve longitudinal movement relative to the pin and body structure, d) at least one of the body structure end walls having a bore in alignment with the sleeve bore threading, e) whereby the nut device may be rotatably connected to a longitudinally extending member having threading engaging the sleeve, and locked to the member by squeezing of the sleeve, in response to sliding engagement of the sleeve side taper with the body tapered bore.

Another object is to provide for reception and anchoring of the pin opposite ends in openings provided in nut body structure end walls, facilitating ease of assembly.

A further object is to provide for attachment of a body end wall to a body side wall, after insertion of the sleeve and pin into the body hollow, to facilitate assembly of the nut device. The sleeve typically has surfaces at opposite sides of the split, the surfaces having spacing therebetween greater than the width of the pin in a direction extending between the surfaces.

Yet another object is to provide for engagement of the body end walls and the sleeve with the threaded fastener, for rugged connection of the nut device and the axially movable sleeve to the threaded fastener, in response to nut tightening on the fastener.

A further object includes providing welding connecting one of the body structure end walls to the body structure side wall. The body structure may have hex side wall flats for wrench tightening purposes.

An additional object is to provide the body structure to include a tubular insert received inwardly of the side wall, and defining the tapered bore.

The method of assembly or constructing of the nut device includes the steps:

a) providing a hollow body structure having a side wall, end walls, and a tapered bore, the body structure defining a longitudinal axis, b) providing a sleeve extending in the body substantially coaxially therewith, the sleeve having a longitudinally extending split, and a side taper engaging the body structure tapered bore, the sleeve having bore thread, c) inserting an anchor pin member to extend longitudinally endwise in the split for blocking rotation of the sleeve, while allowing sleeve longitudinal movement relative to the pin and body structure, d) providing at least one of the body structure end walls with a bore in alignment with the sleeve bore threading, e) whereby the nut device may be rotatably connected to a longitudinally extending member having threading engaging the sleeve and end wall threading, and locked to the member by squeezing the sleeve, in response to sliding engagement of the sleeve side taper with the body tapered bore.

The internal threading may be cut in the sleeve, while the sleeve is in the body structure, for threading alignment purposes to receive the fastener, and to pass the fastener through openings in the end walls.

The method may also include providing the body structure to include a tubular insert received inwardly of the side wall, and defining the tapered bore, and providing the sleeve with one or more flexures to facilitate flexing and squeeze locking of the sleeve to the member.

These and other objects and advantages of the invention, as well as the details of an illustrative embodiment, will be more fully understood from the following specification and drawings, in which:

DETAILED DESCRIPTION

Figure 8:
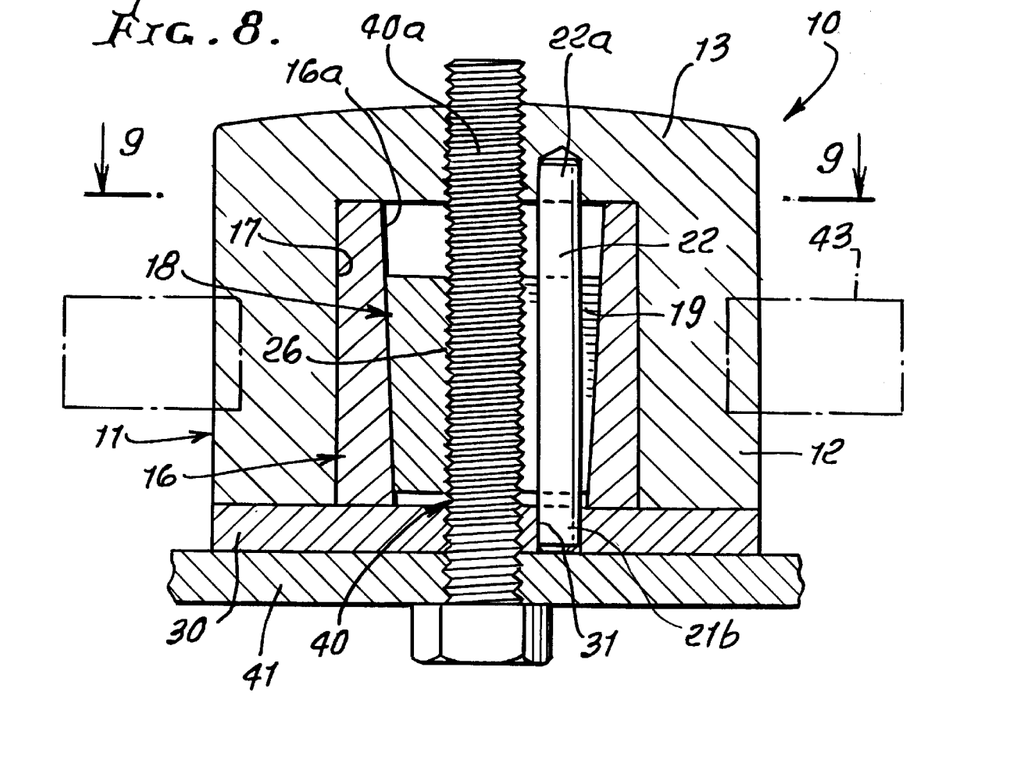
FIG. 8 shows the completely assembled nut device, tightened onto a fixed fastener.

Referring first to FIG. 8, it shows a completely assembled nut device 10, which is a preferred form of the invention. Other forms of the nut device, performing its functions, can be made. Various ways of assembling its components can also be provided.

Figure 1:
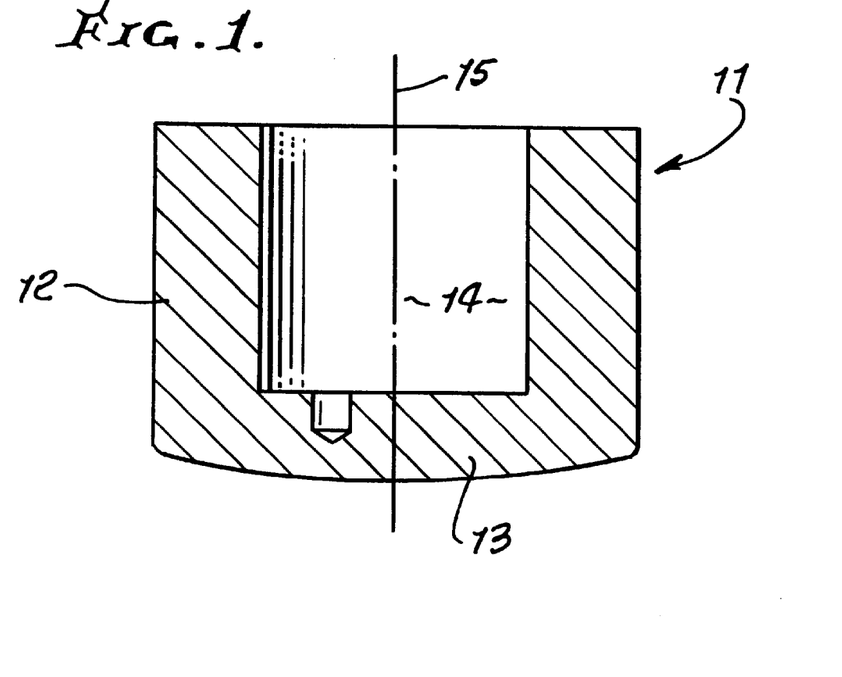
FIGS. 1–7 are axial sections showing successive steps in the assembly and formation of the nut device components.
Figure 2:
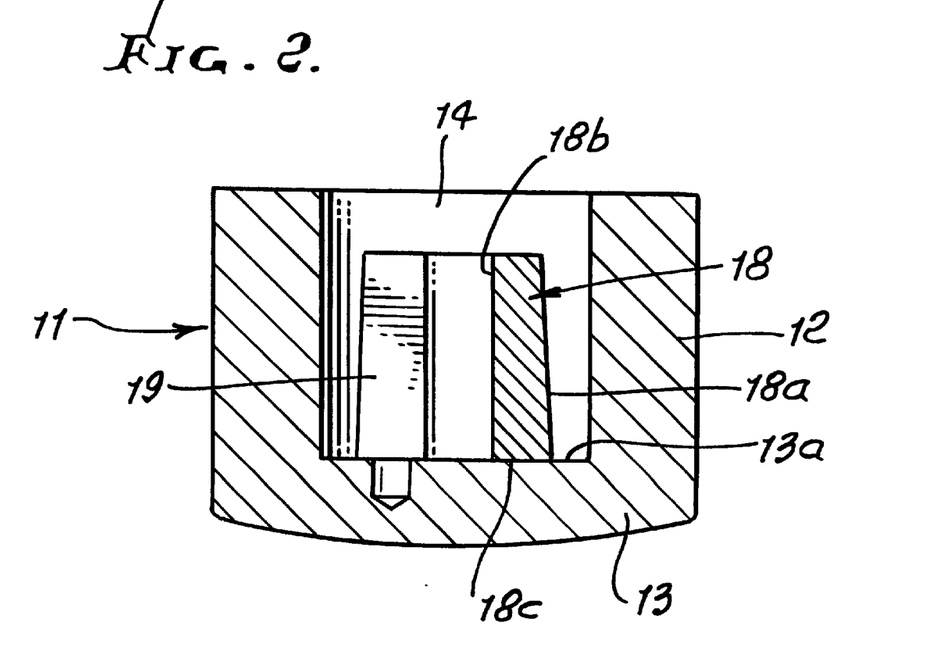

One preferred way to assembly it is shown in FIGS. 1–7. As shown in FIGS. 1 and 2, a hollow body structure is provided, as indicated at 11. It has an outer side wall 12, and an end wall 13, integral with wall 12. A body cylindrical hollow or cavity appears at 14; and a longitudinal axis is indicated at 15. Side wall 12 preferably has outer side flats seen at 12a in FIG. 9, and such flats may form a hexagon, for ease of fitting a wrench that turns the nut. Body 11 is a nut body.

Figure 3:
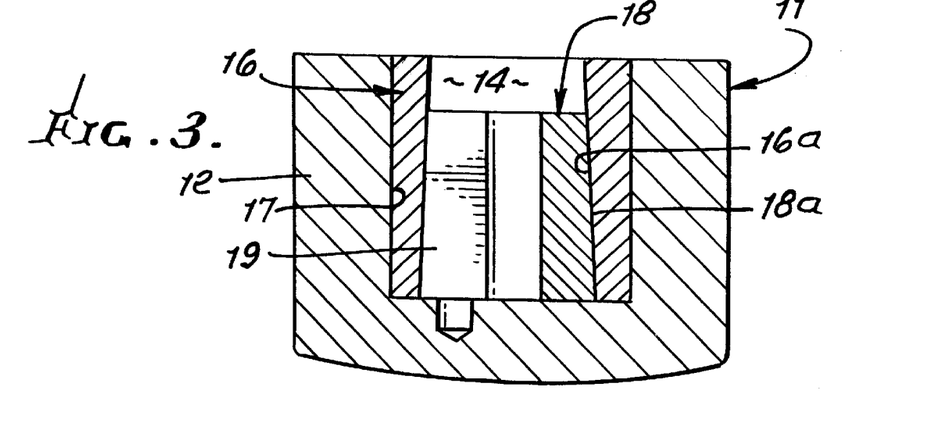
Figure 4:
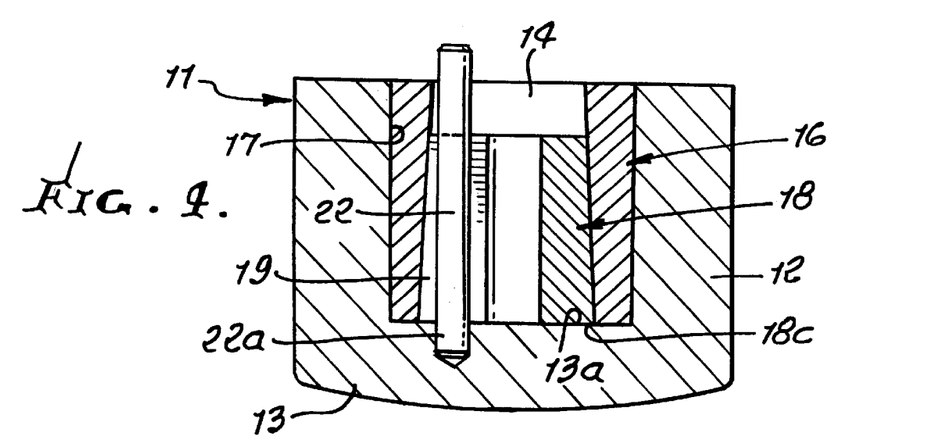
Figure 5:
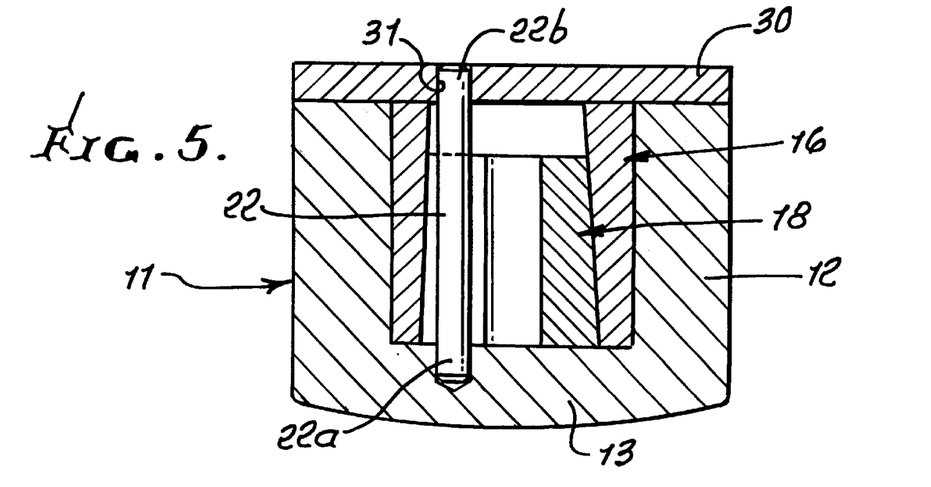

The body structure defines a tapered bore, as for example is shown at 16a in FIG. 3. That bore is typically and advantageously provided by a tubular insert 16 coaxially received in a bore 17 defined by side wall 12. Alternately, tapered bore 16*a* may be provided by an inner surface of side wall 12.

Figure 9:
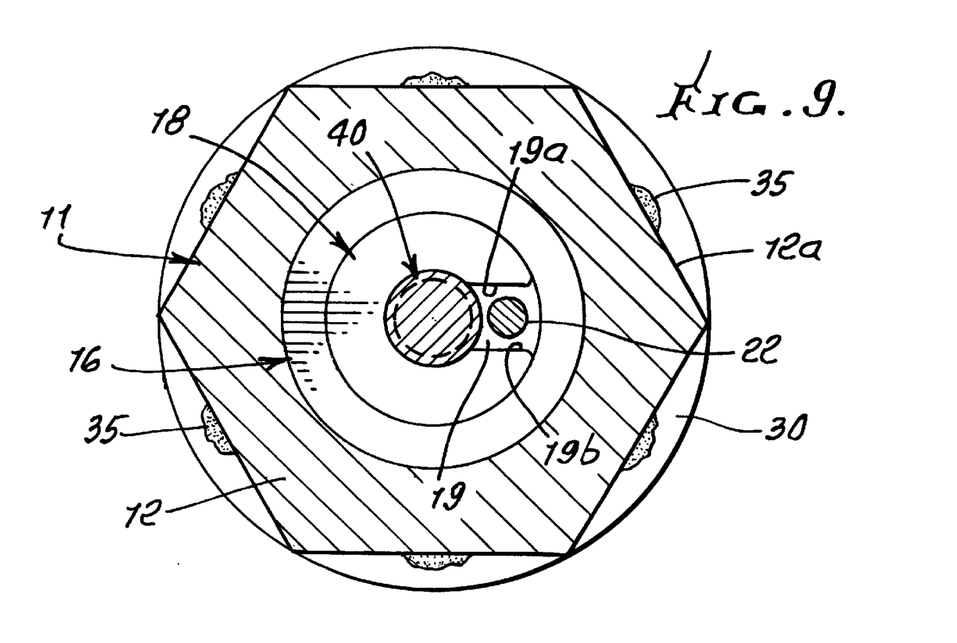
FIG. 9 is an end view taken on lines 9—9 of FIG. 8.

FIG. 2 shows the step of inserting coaxially into hollow 14, an insert such as sleeve 18, so that the end 18*c* of the insert or sleeve engages inner surface 13*a* of end wall 13. The outer side surface 18*a* of 18 tapers away from end wall 13, as shown. The insert or sleeve defines a longitudinally extending split 19, as also seen in FIG. 9. If the insert is a sleeve, split 19 intersects the sleeve bore 18*b* and its outer surface 18*a*, along the sleeve length, whereby the sleeve can be resiliently compressed inwardly by force exerted against its tapered outer surface, tending to close the split walls 19*a* at 19*b* toward one another. See FIG. 9.

FIG. 3 shows the axially tapered outer surface 18*a* engaging the tapered bore 16*a*, whereby as the insert sleeve 18 is displaced axially in the body structure 11, the tapered surfaces 18*a* and 16*a* interferingly engage tending to close the split 19.

Figure 6:
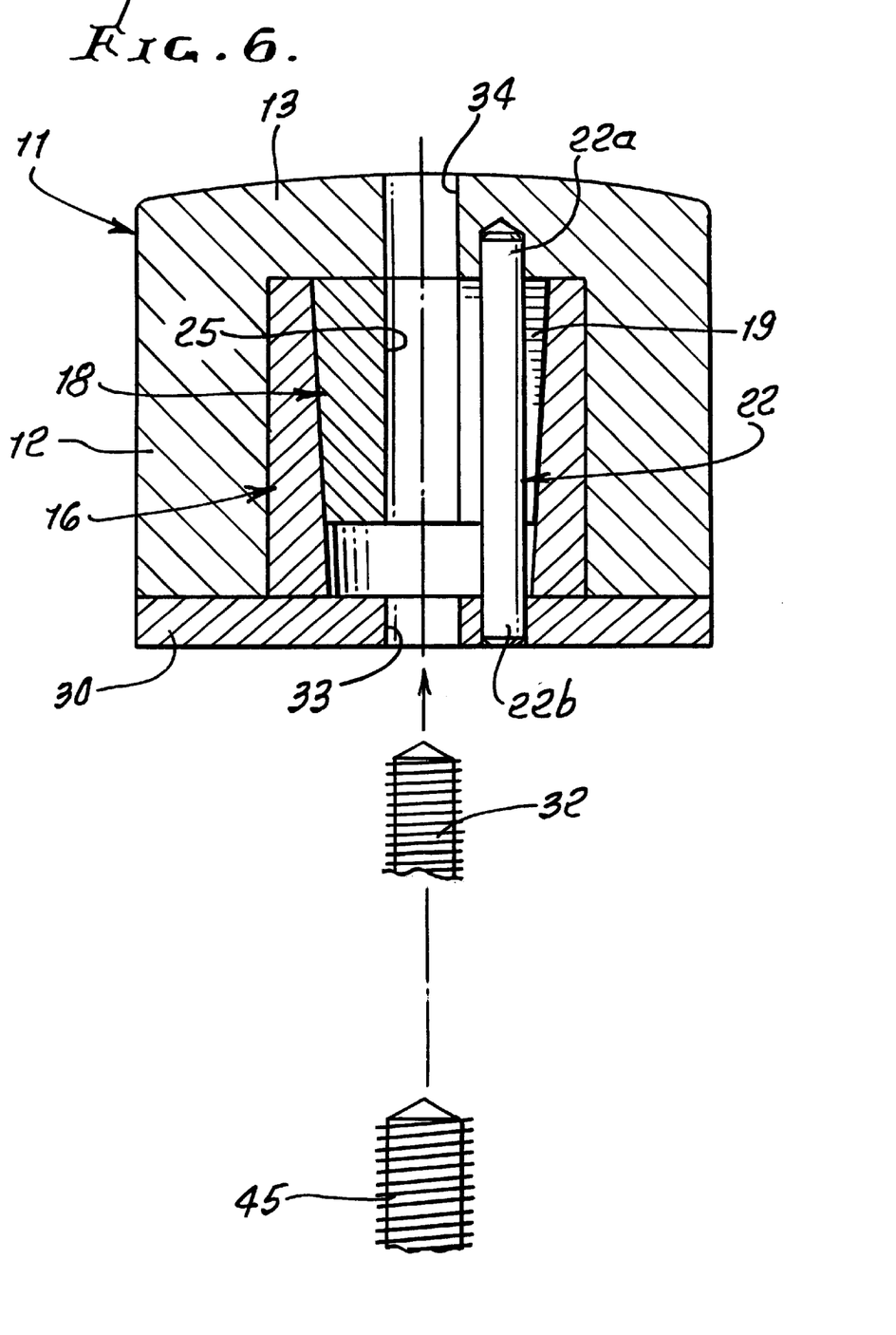
Figures 7, 10, 11:
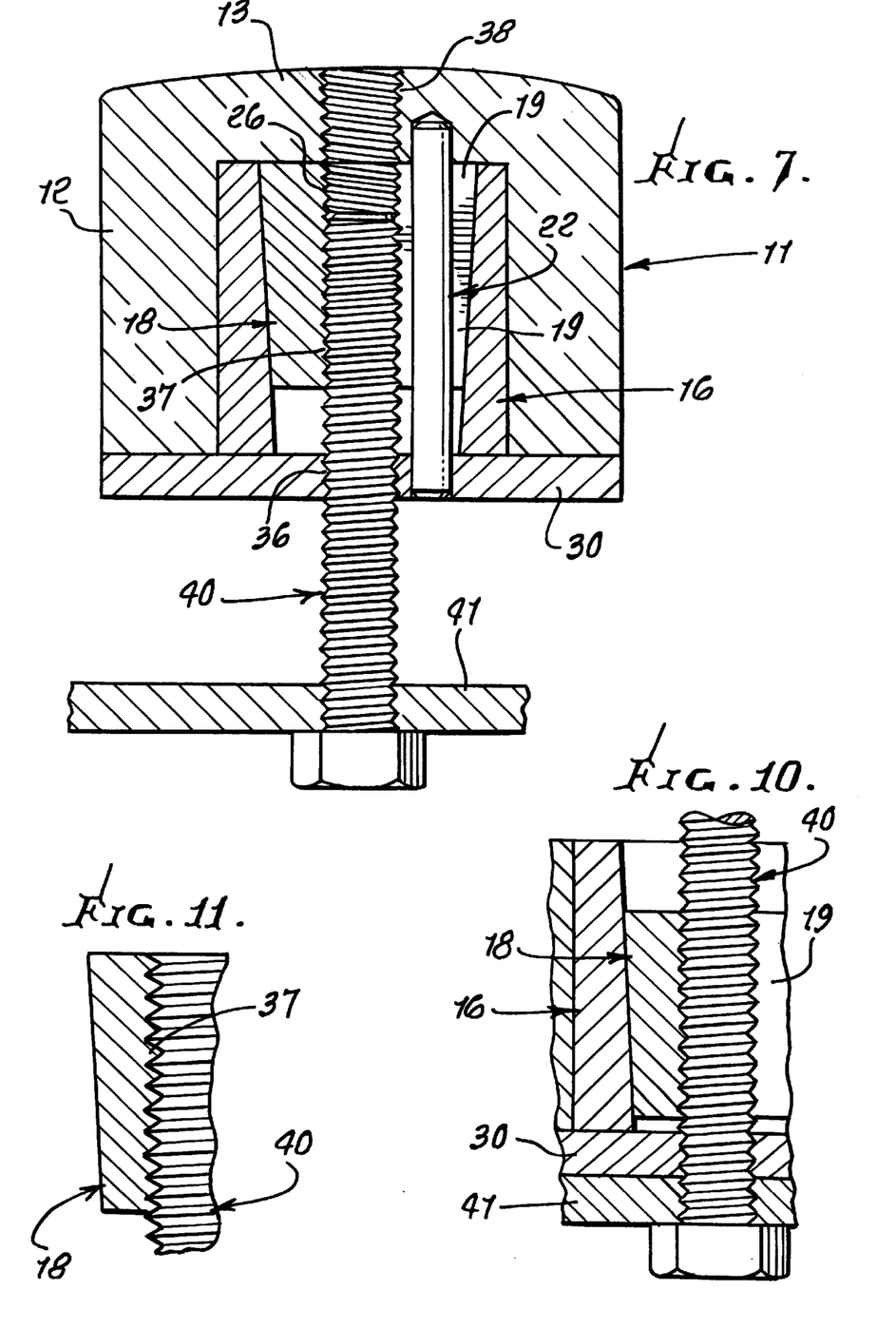
FIG. 10 is a fragmentary section showing sleeve endwise tightening displacement to grip the attachment fastener.
FIG. 11 is a section showing interengaged threads of components.

FIGS. 4–7 show a pin 22 extending longitudinally endwise in the split 19, blocking rotation of the sleeve 18, but allowing its axial travel, whereby surfaces 18*a* and 16*a* have cam engagement tending to close the split 19. Pin 22 has pin end 22*a* anchored at one end in and to body end wall 13. Accordingly, pin 22 blocks sleeve rotation, and also guides its axial travel in the hollow body cavity 14. Sleeve 18 has formed therein an internal thread at 26, as shown in FIGS. 7 and 8.

An opposite end wall for the body structure is shown at 30, and may be welded to the side wall 12, as indicated at locations 35 in FIG. 9. Note that the opposite end 22*b* of the pin is received or anchored in bore or recess 31 in end wall 30.

FIG. 6 shows a drill 32 to be advanced endwise and rotated to drill coaxial openings 33 and 34 in wall members 30, and 13, while passing through bore 25. Subsequently, a tap or threading tool 45 may be rotated and advanced to form coaxial threading at 36–38 in 30, 18 and 13, the threads then aligned axially and rotatably to receive a threaded fastener, as indicated at 40 in FIG. 7.

Nut device 10 may be rotated on the fastener 40, fixed to a support 41, whereby the nut tightens on and rotatably connects to the fastener and support, as shown in FIG. 8. Note wrench parts 43 to turn the nut. During completion of such turning, the split insert or sleeve 18 is advanced relatively axially on the thread 40*a* of the fastener, to effect squeezing of the insert or sleeve 18, to progressively increasingly and lockingly grip the thread of the longitudinally extending fastener shank, as seen in FIG. 7.

It will further be appreciated that pin 22, being anchored to the parts 13 and 30, prevents loosening movement of the sleeve 18, as might tend to occur during vibration of the nut device. This enhances the holding effectiveness of the nut device.

Figures 11A, 12, 13:
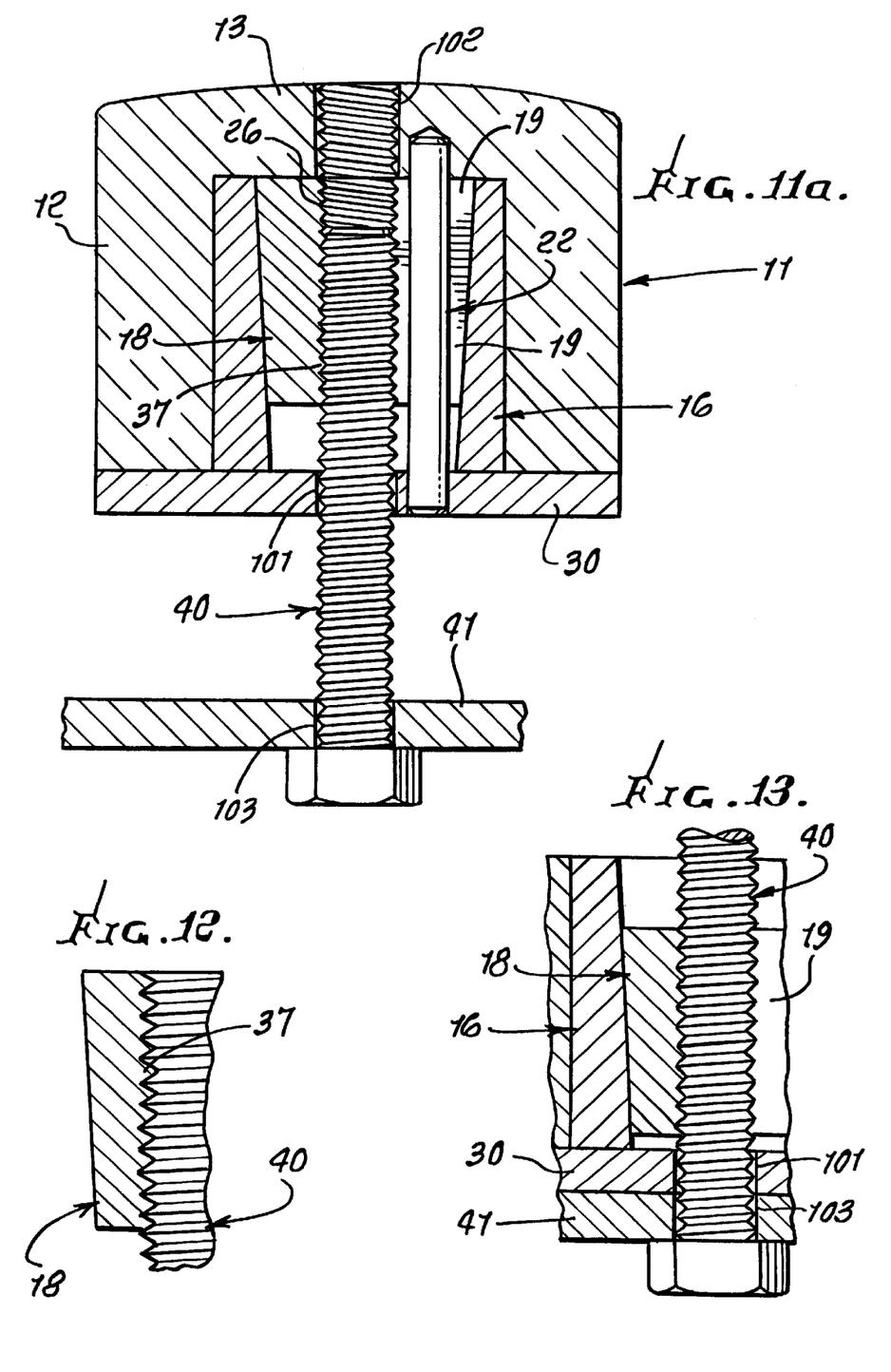
FIGS. 11a, 12 and 13 are views like FIGS. 7, 10 and 11, and showing modifications.

In FIGS. 11–13, the body end walls 30 and 13 have unthreaded bores 101 and 102, formed therein, as shown, to pass the threaded fastener, and to guide the body structure on the fastener 40, as the body structure is tightened down on the support 41. That support may also have an unthreaded bore 103, as shown. The action of the sleeve 18 to tighten on the fastener remains the same.

Figure 14:
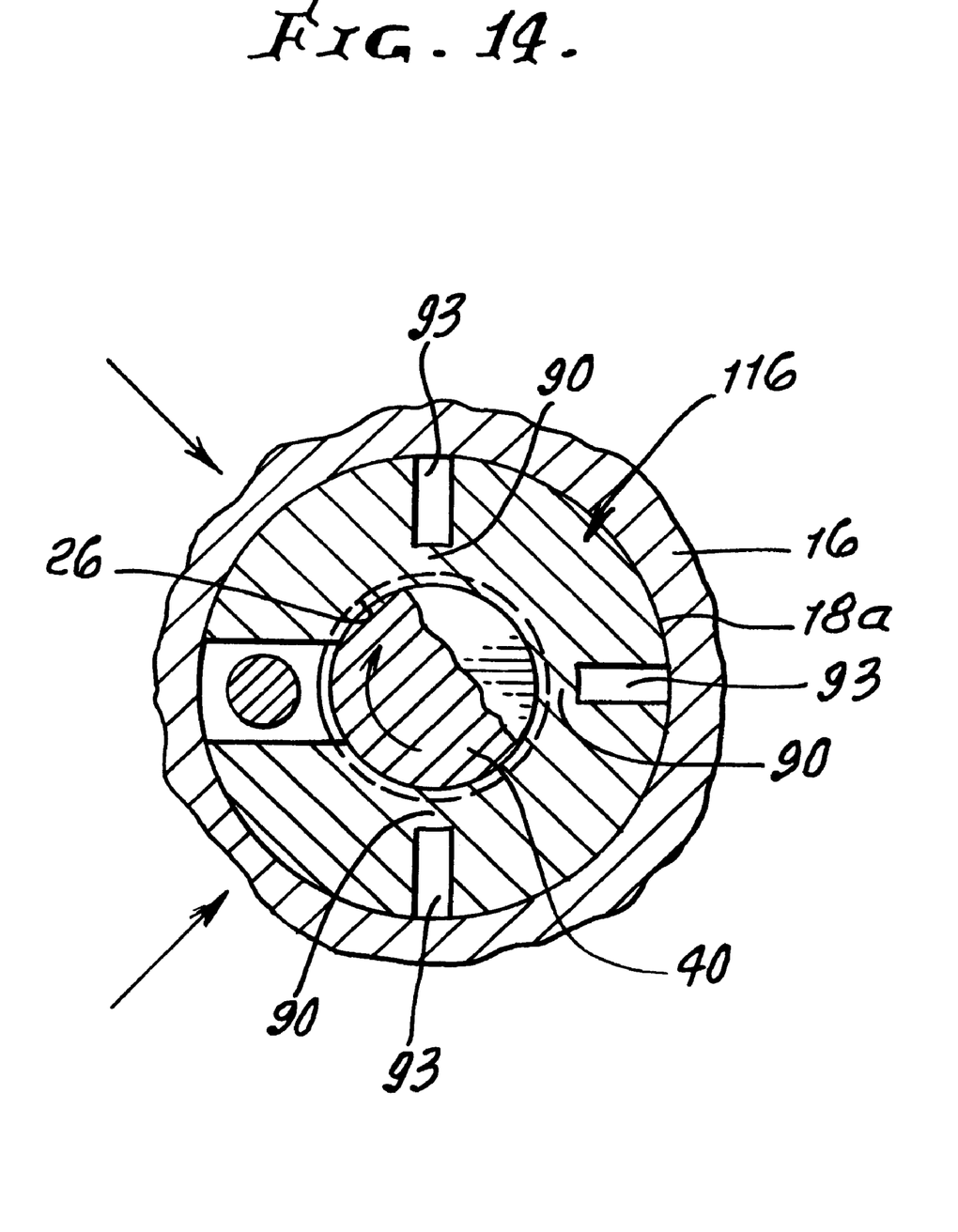
FIG. 14 is a section taken through the axis of a further modified form of the invention.

In FIG. 14, the modified sleeve 116 is like sleeve 16 as described in FIGS. 11*a*, 12 and 13, excepting that it has at least one flexure spaced from the split 19. Multiple such flexures 90 are shown and configured to flex more easily in response to squeezing of the sleeve by the tubular insert 16 in response to rotation of the nut body 11 relative to threaded member 40, to tighten or lock the nut to wall 41. Such enhanced sleeve flexing capability facilitates lock-up, as well as release.

It will be seen that the flexures 90 are spaced from the split 19; that they preferably extend closer to the sleeve bore thread 26 than to the sleeve outer tapered surface 18*a*; and that they also preferably extend adjacent thread 26. They resiliently flex in response to squeezing of the sleeve. Further, the sleeve may typically have multiple slots 93 extending outwardly from the flexures to intersect the sleeve side surface 18*a*, and that the slots 93 extend the full length of the sleeve between its opposite ends, as do the flexures. Three such slots, and three flexures, are shown.

I claim:

1. A nut device comprising, in combination:
   a) a hollow body structure having a side wall, end walls, and a tapered bore, the body structure defining a longitudinal axis,
   b) a sleeve extending in the body substantially coaxially therewith, the sleeve having a longitudinally extending split, and a side taper engaging said body structure tapered bore, the sleeve having a bore thread,
   c) an anchor pin extending longitudinally endwise in said split and anchored to at least one of said body structure end walls, for blocking rotation of the sleeve, while allowing sleeve longitudinal movement relative to the pin and body structure, the pin having opposite ends received in openings defined by said end walls,
   d) at least one of said body structure end walls having a bore in alignment with said sleeve bore threading,
   e) whereby the nut device may be rotatably connected to a longitudinally extending member having threading engaging said sleeve threading, and locked to said member by squeezing of said sleeve, in response to sliding engagement of the sleeve side taper with said body tapered bore.

2. The combination of claim 1 wherein the sleeve has surfaces at opposite sides of the split, said surfaces having spacing therebetween greater than the width of the pin in a direction extending between said surfaces.

3. The combination of claim 1 wherein the sleeve split intersects the sleeve bore thread.

4. The combination of claim 1 wherein the other of said body structure end walls also has a bore in alignment with said sleeve bore thread, for receiving said member threading, in response to said rotatable connection of said device to said member.

5. The combination of claim 4 including said member in threaded engagement with said sleeve bore thread and received by bores in the body structure end walls.

6. The combination of claim 1 including said member in threaded engagement with said sleeve bore thread and received by said one end wall bore.

7. The combination of claim 1 including welding connecting one of said body structure end walls to the body structure side wall.

8. The combination of claim 1 wherein said body structure side wall has external hex flats.

9. The combination of claim 1 wherein said body structure includes a tubular insert received inwardly of said side wall, and defining said tapered bore.

10. The method of claim 1 including providing the body structure to include a tubular insert received inwardly of said side wall, and defining said tapered bore.

11. The combination of claim 1 wherein the sleeve has at least one flexure spaced from said split to flex in response to said squeezing of the sleeve to facilitate locking of the sleeve threading to said member.

12. The combination of claim 11 wherein the sleeve has multiple of said flexures, spaced from the split.

13. The combination of claim 12 wherein said flexures extend adjacent the sleeve bore thread.

14. The combination of claim 12 wherein the sleeve has multiple slots extending outwardly from the flexures to intersect the sleeve side taper.

15. The combination of claim 11 including said member adjacent which said at lest one flexure extends.

16. The method of providing a nut device, which includes the steps:
   a) providing a hollow body structure having a side wall, end walls, and a tapered bore, the body structure defining a longitudinal axis,
   b) providing a sleeve extending in the body substantially coaxially therewith, the sleeve having a longitudinally extending split, and a side taper engaging said body structure tapered bore, the sleeve having a bore thread,
   c) inserting an anchor pin member to extend longitudinally endwise in said split, for blocking rotation of the sleeve, while allowing sleeve longitudinally movement relative to the pin and body structure, the pin having opposite ends, and including locating said pin opposite ends respectively in openings defined by said end walls,
   d) providing at least one of the body structure end walls with a bore in alignment with said sleeve bore threading, threading engaging said sleeve threading, and locked to said member by squeezing of said sleeve, in response to sliding engagement of the sleeve side taper with said body tapered bore.

17. The method of claim 16 including forming internal threading in the sleeve, while the sleeve is in the body structure, for thread alignment.

\* \* \* \* \*